(12) United States Patent
Zha

(10) Patent No.: US 10,191,327 B2
(45) Date of Patent: Jan. 29, 2019

(54) EDGE-LIT TYPE BACKLIGHT MODULE, DISPLAY AND LIGHT GUIDE PLATE

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/533,651

(22) PCT Filed: May 17, 2017

(86) PCT No.: PCT/CN2017/084682
§ 371 (c)(1),
(2) Date: Jun. 6, 2017

(87) PCT Pub. No.: WO2018/192041
PCT Pub. Date: Oct. 25, 2018

(65) Prior Publication Data
US 2018/0299729 A1   Oct. 18, 2018

(30) Foreign Application Priority Data
Apr. 17, 2017  (CN) .......................... 2017 1 0249333

(51) Int. Cl.
*F21V 8/00*   (2006.01)
*G02F 1/1335*   (2006.01)

(52) U.S. Cl.
CPC ..... *G02F 1/133602* (2013.01); *G02B 6/0031* (2013.01); *G02F 1/133553* (2013.01)

(58) Field of Classification Search
CPC ......... G02F 1/133553; G02F 1/133602; G02B 6/031
See application file for complete search history.

(56) References Cited

U.S. PATENT DOCUMENTS

2004/0022050 A1*   2/2004   Yamashita ........... G02B 6/0021
                                                                 362/615
2005/0140848 A1    6/2005   Yoo et al.
(Continued)

FOREIGN PATENT DOCUMENTS

CN   106094095 A   11/2016
CN   106500008 A   3/2017

*Primary Examiner* — Thomas M Sember
(74) *Attorney, Agent, or Firm* — Andrew C. Cheng

(57) ABSTRACT

The disclosure discloses an edge-lit type backlight module, a display and a light guide plate. The edge-lit type backlight module includes at least two light guide plates disposed to be overlapped. Each of the light guide plates respectively includes a light-emitting surface, a bottom surface and at least one light incident surface. The bottom surface of the light guide plate on an upper layer and the light-emitting surface of the light guide plate on a lower layer are disposed opposite. Light sources are disposed on the light incident surfaces of each of the light guide plates, and disposed to be mutually independent. In travel directions of light of the light sources, each of the light guide plates is disposed with light-emitting regions and total reflection regions disposed alternately. The light emitted from the light sources is totally reflected in the total reflection regions.

8 Claims, 4 Drawing Sheets

(56) References Cited

U.S. PATENT DOCUMENTS

| | | |
|---|---|---|
| 2008/0030650 A1 | 2/2008 | Kitagawa et al. |
| 2009/0129116 A1 | 5/2009 | Kim et al. |
| 2009/0167990 A1 | 7/2009 | Konno et al. |
| 2013/0329457 A1 | 12/2013 | Huang |

* cited by examiner

EDGE-LIT TYPE BACKLIGHT MODULE, DISPLAY AND LIGHT GUIDE PLATE

FIELD OF THE DISCLOSURE

The disclosure relates to a liquid crystal display panel technical field, and more particularly to an edge-lit type backlight module, a display and a light guide plate.

BACKGROUND

Liquid crystal displays gradually become critical roles of consumptive electrical products, which are widely applied in displays of devices such as mobile terminals with high image resolution and color screens. The requirement of the display quality on the liquid crystal displays is increasing due to the higher demand on visual experiences. And the highly dynamic contrast technology is gradually grown to be the development trend. The dynamic contrast ratio of displays and the contrast ratio of an image developed by eyes in a single shot are basically approaching, which can enhance the resolution of brightness and dimness of displays.

The currently adopted technology is the dynamic spectrophotometry, which is dividing display regions and backlight into multiple respectively corresponding sub-regions. Effects such as higher brightness, dimmer dimness, enhancement of the dynamic contrast ratio of various sub-regions, etc. can be achieved by combination of backlight adjustment and gray-scale control according to the range covered by the brightness of display images in the sub-regions. The conventional backlight module is a direct-lit backlight module, which adopts a certain amount of emitter arrays to make the light guide plate to form the sub-regions as many as possible, resulting in relatively good effects regarding to division of image details and control of brightness. But as the light emitter (e.g. LED, etc.) occupies a certain space, and the light emitting angle has a certain spreading property, relatively long light mixing distance will be required to achieve even distribution of light, leading to the thickness of the direct-lit backlight module to be relatively thick, which is merely suitable for a display insensitive to the thickness and cannot be widely used in liquid crystal displays.

SUMMARY

Accordingly, the disclosure provides an edge-lit type backlight module, a display and a light guide plate. The edge-lit type backlight module of the disclosure can enhance the dynamic contrast ratio of the backlight module.

In order to solve the technical problem above, the disclosure provides a light guide plate applicable for an edge-lit type backlight module.

The light guide plate includes a light-emitting surface, a bottom surface and at least one light incident surface. The light guide plate is disposed with light-emitting regions and total reflection regions disposed alternately, configured to totally reflect light emitted from a light source disposed on a side of the light incident surface in the total reflection regions, and emit the light in the light-emitting regions.

The light guide plate further includes a plurality of interfaces extending along travel directions of the light of the light source. The plurality of interfaces are configured to divide the light guide plate into a plurality of sub-regions to prevent mutual interference between the light travelled in two adjacent sub-regions among the plurality of sub-regions.

The light-emitting regions of the light guide plate are disposed with a diffraction grating, and the diffraction grating is disposed on the light-emitting surface of the light guide plate.

An index of refraction of the interfaces is smaller than an index of other regions of the light guide plate.

Arrangement sequences of the light-emitting regions and the total reflection regions on the two adjacent sub-regions on the light guide plate are identical or opposite.

The disclosure further provides an edge-lit type backlight module. The backlight module includes at least two light guide plates disposed to be overlapped, and a plurality of light sources. Each of the light guide plates respectively includes a light-emitting surface, a bottom surface and at least one light incident surface. The bottom surface of the light guide plate on an upper layer and the light-emitting surface of the light guide plate on a lower layer are disposed opposite.

The plurality of light sources are respectively disposed on the light incident surface of each of the light guide plates, and disposed to be mutually independent.

In travel directions of light of the light sources, each of the light guide plates is disposed with light-emitting regions and total reflection regions disposed alternately. The light emitted from the light sources is totally reflected in the total reflection regions; the light-emitting regions of each of the light guide plates and the total reflection regions of the adjacent light guide plate(s) are disposed opposite.

The disclosure further provides a liquid crystal display. The liquid crystal display includes a display panel, a display driving control circuit and a backlight module.

The display panel and the display driving control circuit are electrically connected to provide control signals and digital signals to the display panel for displaying images on the display panel.

The backlight module is disposed beneath the display panel to be a light source of the display panel.

The backlight module includes at least two light guide plates disposed to be overlapped, and a plurality of light sources. Each of the light guide plates respectively includes a light-emitting surface, a bottom surface and at least one light incident surface. The bottom surface of the light guide plate on an upper layer and the light-emitting surface of the light guide plate on a lower layer are disposed opposite.

The plurality of light sources are respectively disposed on the light incident surface of each of the light guide plates, and disposed to be mutually independent.

In travel directions of light of the light sources, each of the light guide plates is disposed with light-emitting regions and total reflection regions disposed alternately. The light emitted from the light sources totally reflected in the total reflection regions; the light-emitting regions of each of the light guide plates and the total reflection regions of the adjacent light guide plate(s) are disposed opposite.

Beneficial effects: distinguishing from the prior art, the edge-lit type backlight module provided by the disclosure includes at least two light guide plates disposed to be overlapped. Each of the light guide plates respectively includes a light-emitting surface, a bottom surface and at least one light incident surface. The bottom surface of the light guide plate on an upper layer and the light-emitting surface of the light guide plate on a lower layer are disposed opposite. The plurality of light sources are respectively disposed on the light incident surface of each of the light guide plates, and disposed to be mutually independent. In travel directions of light of the light sources, each of the light guide plates is disposed with light-emitting regions and total reflection regions disposed alternately. The light emitted from the light sources is totally reflected in the total reflection regions; the light-emitting regions of each of the light guide plates and the total reflection regions of the adjacent light guide plate(s) are disposed opposite. The alternately disposed light-emitting regions and total reflection regions on adjacent light guide plates enable the edge-lit type backlight module to have a plurality of light-emitting sub-regions, and the light sources of the light guide plates are mutually independent, which can control brightness of the plurality of light-emitting sub-regions independently, as a result, the edge-lit type backlight module can approach the light-emitting effect of a direct-lit backlight module and improve the dynamic contrast ratio of the edge-lit type backlight module.

DETAILED DESCRIPTION OF PREFERRED EMBODIMENTS

Figure 1:
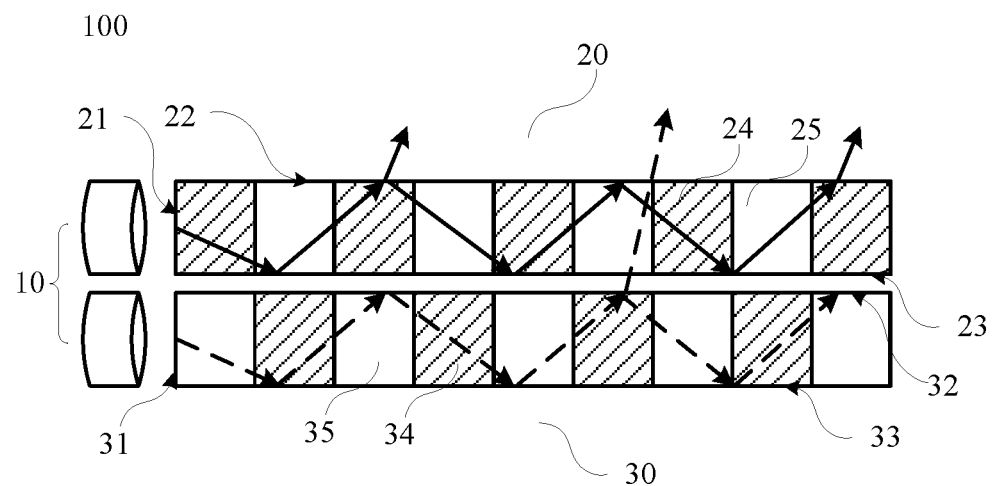
FIG. 1 is a lateral view of an edge-lit type backlight module according to a first embodiment of the disclosure.

In order to better illustrate the disclosure to a person skilled in the art, the edge-lit type backlight module, the display and the light guide plate provided by the disclosure will further be described in detail with reference to concrete embodiments along with the accompanying drawings as follows. In the figures, an identical label represents the same structure and region in the embodiments and figures.

In order to enable the edge-lit type backlight module to have a plurality of sub-regions that can adjust the brightness independently, the embodiment discloses an edge-lit type backlight module. The edge-lit type backlight module includes at least two light guide plates disposed to be overlapped. Each of the light guide plates respectively includes a light-emitting surface, a bottom surface and at least one light incident surface. The bottom surface of the light guide plate on an upper layer and the light-emitting surface of the light guide plate on a lower layer are disposed opposite. A plurality of light sources are respectively disposed on the light incident surface of each of the light guide plates, and disposed to be mutually independent. In travel directions of light of the light sources, each of the light guide plates is disposed with light-emitting regions and total reflection regions disposed alternately. The light emitted from the light sources is totally reflected in the total reflection regions; the light-emitting regions of each of the light guide plates and the total reflection regions of the adjacent light guide plate(s) are disposed opposite.

In the embodiment, according to the emitting angle of light emitted from the light source and the total reflection conditions, a light guide plate with a proper index of refraction is selected to be a light guide plate of the edge-lit type backlight module, so that the light emitted from the light source meets the total reflection conditions, and is totally reflected. The partial regions are total reflection regions. The optical process is performed on other regions of the light guide plate, and the light emitted from the light source is scattered or diffracted through the optically processed regions, and further emitted through the light-emitting surface. The optically processed regions are light-emitting regions.

As the index of refraction of the light guide plate is larger than the index of refraction of air, the light emitted from the light-emitting region of the light guide plate on bottom can enter the total reflection region of the light guide plate on top for sure. Therefore, two adjacent light guide plates can be spaced apart, or mutually adjacent. In other words, a gap can exist between the bottom surface of the light guide plate on an upper layer and the light-emitting surface of the light guide plate on a lower layer, or the bottom surface of the light guide plate on the upper layer and the light-emitting surface of the light guide plate on the lower layer are tightly contacted.

According to the edge-lit type backlight module of the embodiment, the alternately disposed light-emitting regions and total reflection regions on adjacent light guide plates enable the edge-lit type backlight module to have a plurality of sub-regions, and the light sources of the light guide plates are mutually independent, which can control brightness of the plurality of sub-regions independently, as a result, the dynamic contrast ratio of the edge-lit type backlight module is enhanced.

Figure 2:
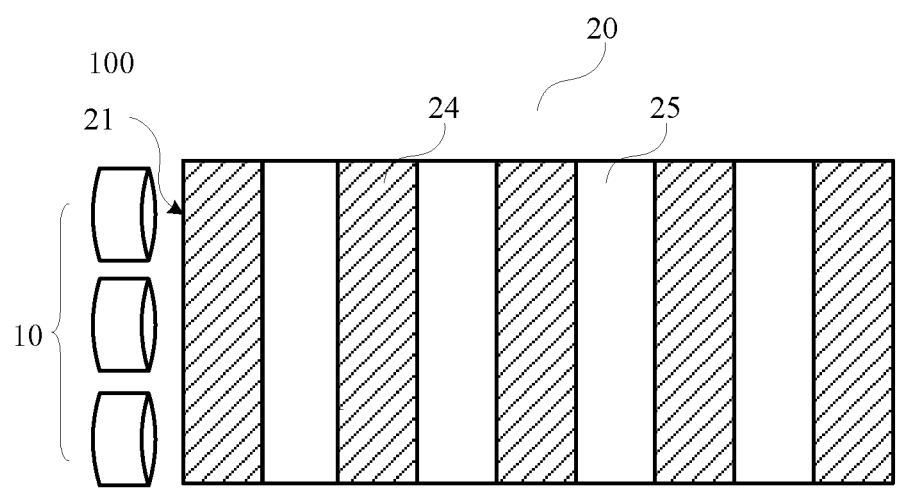
FIG. 2 is a top view of the edge-lit type backlight module according to the first embodiment shown in FIG. 1.

Referring to FIG. 1 and FIG. 2, an edge-lit type backlight module 100 has two light guide plates as an example. FIG. 1 is a lateral view of an edge-lit type backlight module according to a first embodiment of the disclosure. FIG. 2 is a top view of the edge-lit type backlight module according to the first embodiment shown in FIG. 1. As shown in FIG. 1, the edge-lit type backlight module 100 includes a first light guide plate 20 and a second light guide plate 30. The first light guide plate 20 and the second light guide plate 30 both are edge-lit type light guide plates. The first light guide plate 20 includes a light-emitting surface 22, a bottom surface 23 and at least one light incident surface. FIG. 1 merely labels a light incident surface 21. The second light guide plate 30 and the first light guide plate 20 are the same, including a light-emitting surface 32, a bottom surface 33 and at least one light incident surface. FIG. 1 only shows a light incident surface 31 of the second light guide plate 30. The bottom surface 23 of the first light guide plate 20 and the light-emitting surface 32 of the second light guide plate 30 are disposed opposite. The light sources are respectively disposed on the light incident surface 21 of the first light guide plate 20 and the light incident surface 31 of the second light guide plate 30. The light sources 10 of the light guide plates are mutually independent, and brightness of the emitting light can be controlled independently. In travel directions of rays of the light sources 10, the first light guide plate 20 and the second light guide plate 30 both are disposed with light-emitting regions 24, 34 and total reflection regions 25, 35. Shaded parts in FIG. 1 and FIG. 2 are the light-emitting regions, and the blank parts are the total reflection regions. The light-emitting regions 24, 34 and the total reflection regions 25, 35 on the first light guide plate 20 and the second light guide plate 30 are disposed alternately. To be more specific, the light-emitting region 24 of the first light guide plate 20 and the total reflection region 35 of the second light guide plate 30 are corresponding, and the total reflection region 25 of the first light guide plate 20 and the light-emitting region 34 of the second light guide plate 30 are corresponding. Moreover, as shown in FIG. 2, the light incident surfaces 24, 34 of the first light guide plate 20 and the second light guide plate 30 can both be disposed with the plurality of light sources 10. The plurality of light sources 10 are mutually independent as well. The brightness of emitted light can be controlled independently.

The light sources 10 are disposed on the light incident surfaces 21, 31 that are on the same side of the first light guide plate 20 and the second light guide plate 30 in the embodiment. But in other embodiments, the light sources 10 can be disposed on light incident surfaces on different sides of the first light guide plate 20 and the second light guide plate 30. And with respect to each of the light guide plates, the light sources can be disposed on multiple light incident surfaces of the light guide plates. In the embodiment, the plurality of light sources 10 are parallel connected for independent control of the plurality of the light sources 10.

According to the edge-lit type backlight module 100 shown in FIG. 1 and FIG. 2, the regional division of the edge-lit type backlight module 100 of the embodiment is further illustrated. As shown in FIG. 1, in travel directions of light of the light sources 10, the first light guide plate 20 and the second light guide plate 30 both are disposed with the light-emitting regions 24, 34 and the total reflection regions 25, 35. The light-emitting regions 24, 34 and the total reflection regions 25, 35 of the first light guide plate 20 and the second light guide plate 30 are mutually alternate. The light (a solid straight line with an arrow in FIG. 1) emitted from the light sources 10 of the first light guide plate 20 has a relatively large incident angle with respect to the light-emitting surface 22 of the first light guide plate 20, which accordingly is totally reflected in the total reflection regions 25 of the first light guide plate 20 due to satisfaction of total reflection, and the light emitted from the light sources 10 is scattered or diffracted on the light-emitting regions 24 of the first light guide region 20 due to the optical process and subsequently emitted from the regions. The light (the broken line with an arrow in FIG. 1) emitted from the light sources 10 of the second light guide plate 30 is totally reflected in the total reflection regions 35 of the second light guide plate 30, and emitted from the light-emitting regions 34 of the second light guide plate 30. The light emitted from the light-emitting regions 34 of the second light guide plate 30 will enter the total reflection regions 25 of the first light guide plate 20. As the incident angle of the light emitted from the light-emitting regions 34 of the second light guide plate 30 to the total reflection regions 25 of the first light guide plate 20 on the light-emitting surface 22 of the first light guide plate 20 is too small to satisfy the requirement of total reflection, the light from the light-emitting regions 34 of the second light guide plate 30 to the total reflection regions 25 of the first light guide plate 20 can be emitted through the total reflection regions 25 of the first light guide plate 20. Next, as the light sources 10 of the light guide plates are controlled independently, the brightness of the light emitted from the light-emitting regions 24, 34 of each of the light guide plates can be controlled independently. The light-emitting regions 24 and the total reflection regions on the first light guide plate 20 finally have emitted light, and the brightness of the emitted light can be controlled independently. In other words, the edge-lit type backlight module 100 is divided into multiple independent regions along the travel directions of the light of the light sources 10 by the light-emitting regions 24, 34 and the total reflection regions 25, 35 on the light guide plates, and brightness of the independently regions can be controlled independently, which can enhance the dynamic contrast ratio of the edge-lit type backlight module 100.

Figure 3:
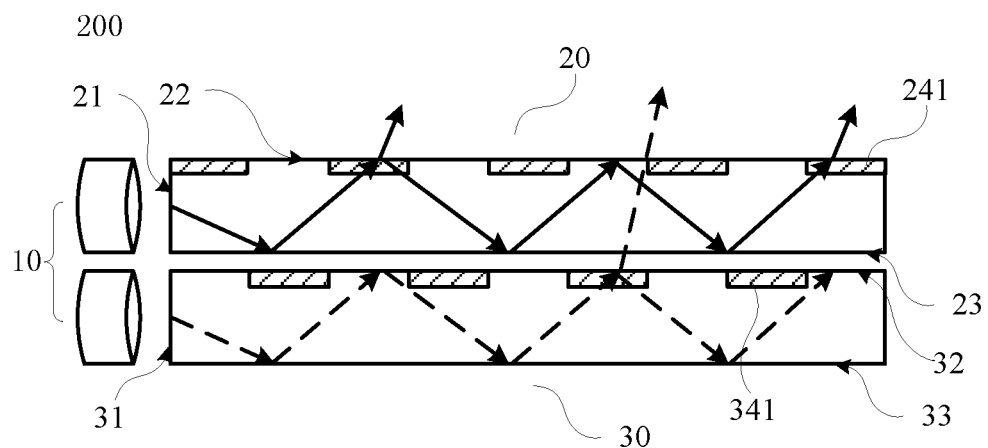
FIG. 3 is a lateral view of an edge-lit type backlight module according to a second embodiment of the disclosure.

Furthermore, referring to FIG. 3, the light-emitting regions 24, 34 of each of the light guide plates can be achieved by disposing diffraction gratings 241, 341. The diffraction gratings 241, 341 are disposed on the light-emitting surfaces 22, 32 of each of the light guide plates. The light emitted from the light sources 10 of the light incident surfaces 21, 31 of each of the light guide plates is diffracted at the diffraction gratings 241, 341 of the light-emitting region. The diffracted beams are emitted through the diffraction gratings 241, 341.

The light emitted from the light sources is diffracted at the diffraction gratings and generates multiple diffraction fringes. In order to improve the display quality, diffraction peaks of the diffracted light in first several levels of the diffraction fringes are preferred to be in visible regions by adjusting parameters of the diffraction gratings such as the period, the duty ratio, etc. The parameters of the diffraction gratings will not be limited by the embodiment. The diffraction peaks of the diffracted light in first several levels of the diffraction fringes should be in visible regions. Optionally, the period of the diffraction gratings is between 200 to 1000 nm, and the duty ratio is from 0.45 to 0.55, which can make the first level of the diffraction peaks to be in the visible regions and other levels of diffraction peaks to be out of the visible regions when the light emitted from the light source goes through the diffraction gratings.

Figure 4:
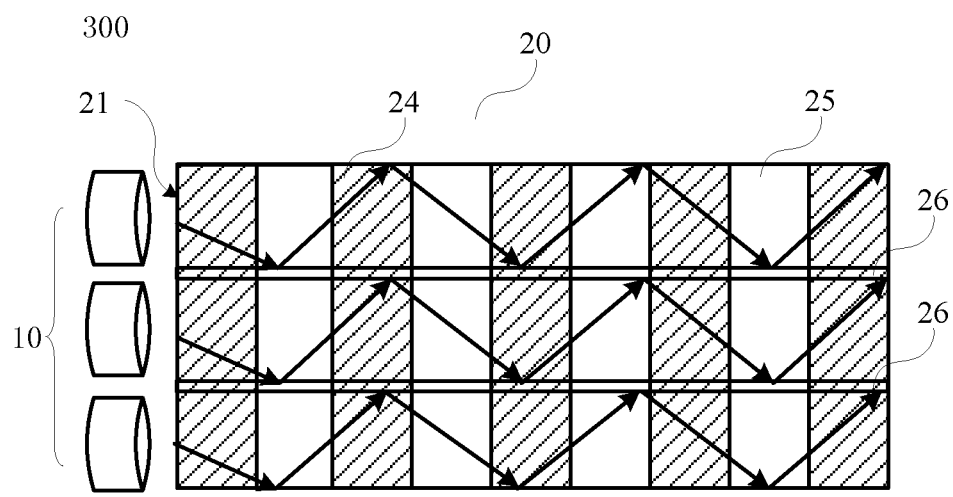
FIG. 4 is a top view of an edge-lit type backlight module according to a third embodiment of the disclosure.

Furthermore, the disclosure further provides another embodiment of the edge-lit type backlight module. Each of the light guide plates of the edge-lit type backlight module in the embodiment respectively is disposed with a plurality of interfaces extending along travel directions of the light of the light source. The plurality of interfaces are configured to divide the light guide plate into a plurality of sub-regions, and the light travelled in two adjacent sub-regions among the plurality of sub-regions will not interfere each other. Referring to FIG. 4, FIG. 4 is a top view of an edge-lit type backlight module according to another embodiment of the disclosure. A top view of an edge-lit type backlight module 300 in the embodiment is identical to FIG. 1 or FIG. 3, which will not be repeated. As shown in FIG. 4, the first light guide plate 20 in the edge-lit type backlight module 300 in the embodiment is disposed with a plurality of interfaces 26 extending along travel directions of the light of the light sources 10. The plurality of interfaces 26 are configured to divide the light guide plate 20 into a plurality of sub-regions. It can be understood that the disposition of interfaces of the second light guide plate and that of the first light guide plate are the same.

In order to separate the light in each of the sub-regions by the interfaces, or totally reflect the light travelled in each of the sub-regions at the interfaces, the index of refraction of the interfaces is smaller than the index of other regions of the light guide plate in the embodiment. Correspondingly, each of the sub-regions is disposed with mutually independent light sources, and brightness of the light sources are controlled independently.

As shown in FIG. 4, each sub-regions of the first light guide plate 20 is disposed with the independent light source 10, for which each sub-region divided by the interfaces 26 on the first light guide plate 20 is independent as well. The first light guide plate 20 is divided into sub-regions similar to a chessboard by combining with the plurality of independent regions divided by the light-emitting regions 24 and the total reflection regions 25 on the first light guide plate 20. The second light guide plate and the first light guide plate are the same, in other words, the entire edge-lit type backlight module is divided into the plurality of sub-regions as shown in FIG. 4, which can divide the edge-lit type backlight module into sub-regions as many as possible by the light-emitting regions, the total reflection regions and the interfaces, and further enhancing the dynamic contrast ratio of the edge-lit type backlight module.

Figure 5:
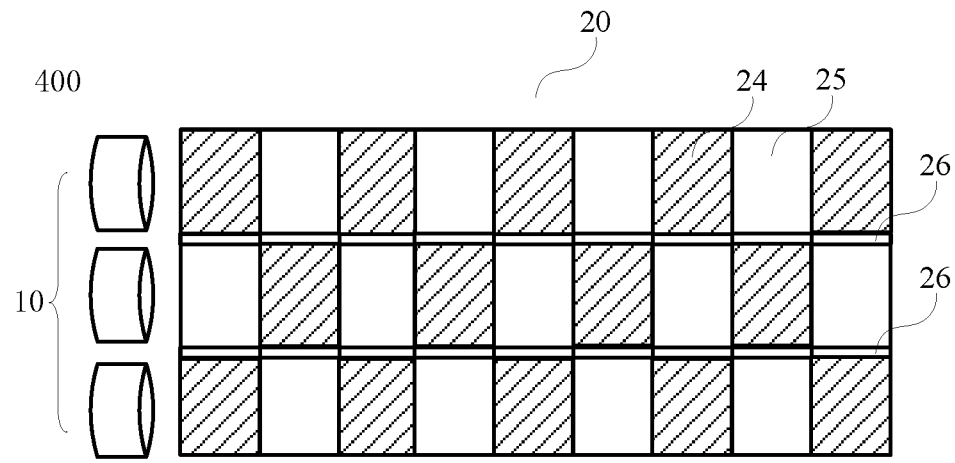
FIG. 5 is a lateral view of an edge-lit type backlight module according to a fourth embodiment of the disclosure.

Furthermore, the arrangement sequence of the light-emitting regions and the total reflection regions on each of the sub-regions on an identical light guide plate in the embodiment are the same. As shown in FIG. 4, the light-emitting regions 24 on two adjacent sub-regions among the sub-regions divided by the interfaces 26 on the first light guide plate 20 are corresponding, and the total reflection regions 25 are corresponding. Moreover, the arrangement sequences of the light-emitting regions and the total reflection regions on each of the sub-regions on one light guide plate can further be different. As shown in FIG. 5, the light-emitting regions 24 and the total reflection regions 25 on two adjacent sub-regions among the sub-regions divided by the interfaces on the first light guide plate 20 are mutually alternate.

Figure 6:
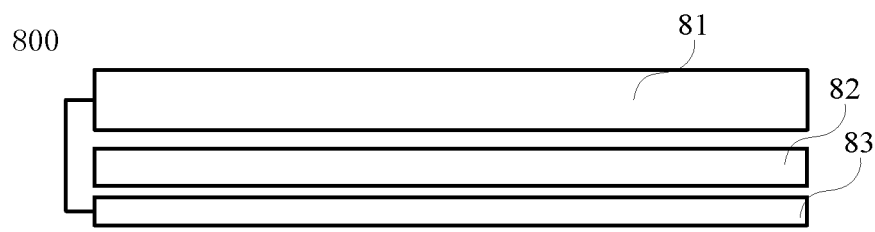
FIG. 6 is a structural schematic view of a liquid crystal display according to an embodiment of the disclosure.

Furthermore, the disclosure further provides a liquid crystal display. Referring to FIG. 6, FIG. 6 is a structural schematic view of a liquid crystal display according to an embodiment of the disclosure. As shown in FIG. 6, a liquid crystal display 800 of the embodiment includes a display panel 81, a display driving control circuit 83 and a edge-lit type backlight module 82. The display panel 81 and the display driving control circuit 83 are connected to provide control signals and digital signals to the display panel 81 for displaying images on the display panel 81. The edge-lit type backlight module 82 is disposed beneath the display panel 81 to be a light source of the display panel 81. The edge-lit type backlight module 82 in the embodiment is any edge-lit type backlight module shown in FIG. 1 to FIG. 5, which will not be repeated.

In the embodiment, the brightness of the display panel can be independently adjusted according to display images of each of the sub-regions during displaying images by using the edge-lit type backlight module described above in the liquid crystal display panel. The brightness of the display panel is higher and the dimness is dimmer, which can enhance the dynamic contrast ratio among various sub-regions of the display panel and improve the display quality of the liquid crystal display.

Figure 7:
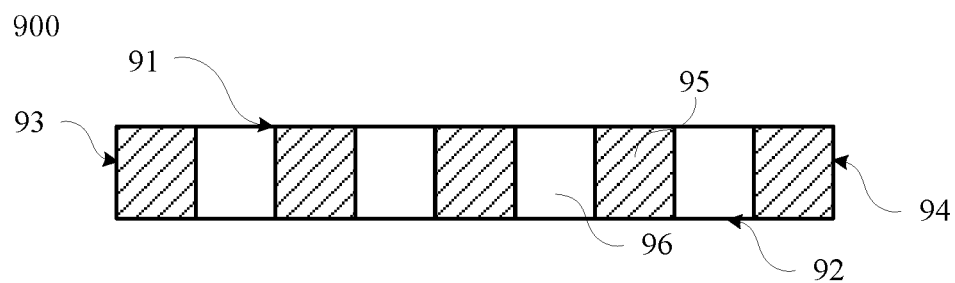
FIG. 7 is a lateral view of a light guide plate according to a first embodiment of the disclosure.
Figure 8:
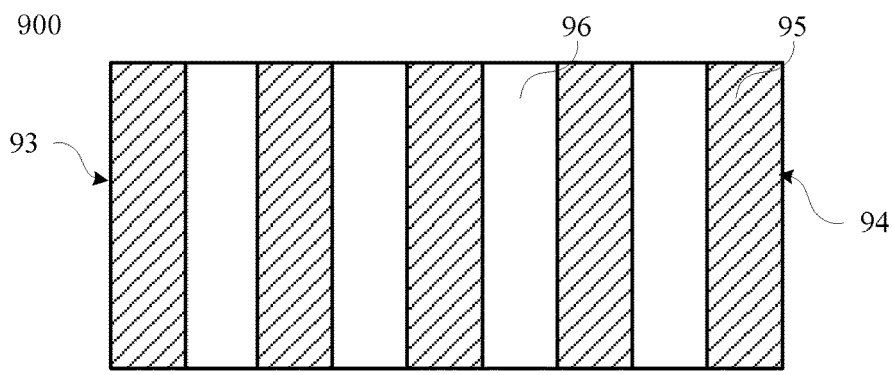
FIG. 8 is a top view of the light guide plate according to the first embodiment shown in FIG. 7.

Furthermore, the disclosure further discloses a light guide plate applicable for an edge-lit type backlight module. Referring to FIG. 7 and FIG. 8, FIG. 7 is a lateral view of a light guide plate according to a first embodiment of the disclosure. FIG. 8 is a top view of the light guide plate according to the first embodiment shown in FIG. 7. As shown in FIG. 7 and FIG. 8, a light guide plate 900 of the embodiment includes a light-emitting surface 91, a bottom surface 92 and at least one light incident surface 93, 94. The light guide plate 900 is disposed with light-emitting regions 95 and total reflection regions 96 disposed alternately, configured to totally reflect light emitted from a light source disposed on a side of the light incident surfaces 93, 94 in the total reflection regions 96, and emit the light from the light-emitting regions 95.

The light guide plate of the embodiment divides the light guide plate into multiple independent regions by disposition of the total reflection regions and the light-emitting regions. It can be understood that the module formed by the light guide plates in the edge-lit type backlight module show in FIG. 1 and FIG. 2 can be formed by disposing the light guide plates of the embodiments to be overlapped and corresponding the light-emitting regions of the first light guide plate in two adjacent light guide plates and the total reflection regions of another light guide plate. The light guide plate of the embodiment is identical to the first light guide plate or the second light guide plate in the edge-lit type backlight module shown in FIG. 1 and FIG. 2, which will not be repeated.

Furthermore, the light-emitting regions of the light guide plate of the embodiment is disposed with diffraction gratings, and the diffraction gratings are disposed on the light-emitting surfaces of the light guide plate. A lateral view of the light guide plate of the embodiment is identical to the first light guide plate or the second light guide plate shown in FIG. 3, which will not be repeated either.

Figure 9:
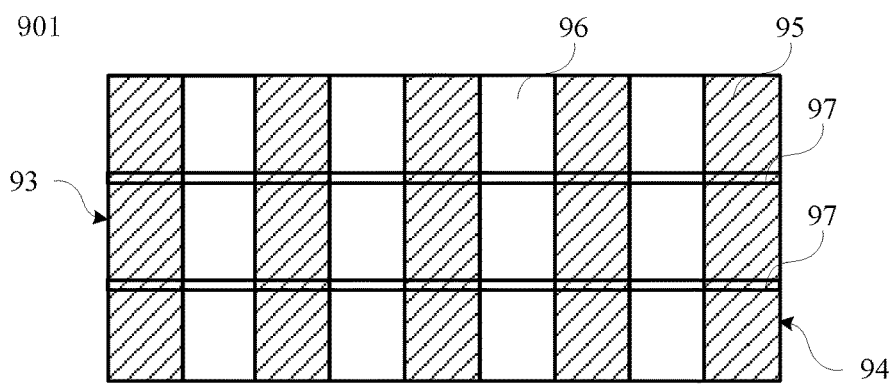
FIG. 9 is a top view of a light guide plate according to a second embodiment of the disclosure.

Furthermore, referring to FIG. 9, FIG. 9 is a top view of a light guide plate according to a second embodiment of the disclosure. The lateral view of the light guide plate of the embodiment is as shown in FIG. 7. A light guide plate 901 of the embodiment further includes a plurality of interfaces 97 extending along travel directions of the light of the light source. The plurality of interfaces 97 are configured to divide the light guide plate into a plurality of sub-regions to prevent mutual interference between the light travelled in two adjacent sub-regions among the plurality of sub-regions. An index of refraction of the interfaces 97 is smaller than an index of other regions of the light guide plate 901. Therefore, if each of the sub-regions is disposed with a light source, the light emitted from the light source of each of the sub-regions will be totally reflected at the interfaces 97 to prevent mutual interference between the light travelled in two adjacent sub-regions among the plurality of sub-regions.

Figure 10:
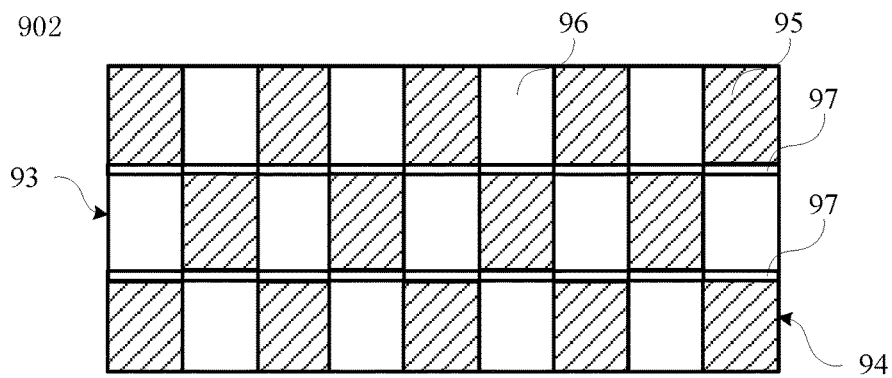
FIG. 10 is a top view of a light guide plate according to a third embodiment of the disclosure.

Furthermore, the arrangement sequences of the light-emitting regions 95 and the total reflection regions 96 on each of the sub-regions on the light guide plate in the embodiment are the same. As shown in FIG. 9, the light-emitting regions 95 on two adjacent sub-regions among the sub-regions divided by the interfaces 97 on the light guide plate 901 are corresponding, and the total reflection regions 96 are corresponding. Moreover, the arrangement sequences of the light-emitting regions 95 and the total reflection regions 96 on each of the sub-regions on light guide plate can further be different. As shown in FIG. 10, the light-emitting regions 95 and the total reflection regions 96 on two adjacent sub-regions among the sub-regions divided by the interfaces 97 on the light guide plate 902 are mutually alternate.

The description above is merely embodiments of the disclosure, which cannot limit the protection scope of the disclosure. Any equivalent structure or process according to contents of the disclosure and the figures, or direct or indirect application in other related fields should be included in the protected scope of the disclosure.

What is claimed is:
1. An edge-lit type backlight module, comprising:
at least two light guide plates disposed to be overlapped, each of the light guide plates respectively comprising a light-emitting surface, a bottom surface and at least one light incident surface, the bottom surface of the light guide plate on an upper layer and the light-emitting surface of the light guide plate on a lower layer disposed opposite;

a plurality of light sources, respectively disposed on the light incident surface of each of the light guide plates, and disposed to be mutually independent;

in travel directions of light of the light sources, each of the light guide plates disposed with light-emitting regions and total reflection regions disposed alternately, the light emitted from the light sources totally reflected in the total reflection regions; the light-emitting regions of each of the light guide plates and the total reflection regions of the adjacent light guide plate(s) disposed opposite.

2. The backlight module according to claim 1, wherein each of the light guide plates is respectively disposed with a plurality of interfaces extending along the travel directions of the light of the light source; the plurality of interfaces are configured to divide the light guide plates into a plurality of sub-regions, the light travelled in two adjacent sub-regions among the plurality of sub-regions has no mutual interference.

3. The backlight module according to claim 2, wherein the plurality of sub-regions are respectively disposed with mutually independent light sources.

4. The backlight module according to claim 2, wherein an index of refraction of the interfaces is smaller than an index of other regions of the light guide plates.

5. A liquid crystal display, comprising a display panel, a display driving control circuit and a backlight module;

the display panel and the display driving control circuit connected to provide control signals and digital signals to the display panel for displaying images on the display panel;

the backlight module disposed beneath the display panel to be a light source of the display panel;

the backlight module comprising at least two light guide plates disposed to be overlapped, each of the light guide plates respectively comprising a light-emitting surface, a bottom surface and at least one light incident surface, the bottom surface of the light guide plate on an upper layer and the light-emitting surface of the light guide plate on a lower layer disposed opposite;

a plurality of light sources, respectively disposed on the light incident surface of each of the light guide plates, and disposed to be mutually independent;

in travel directions of light of the light sources, each of the light guide plates disposed with light-emitting regions and total reflection regions disposed alternately, the light emitted from the light sources totally reflected in the total reflection regions; the light-emitting regions of each of the light guide plates and the total reflection regions of the adjacent light guide plate(s) disposed opposite.

6. The liquid crystal display according to claim 5, wherein each of the light guide plates is respectively disposed with a plurality of interfaces extending along the travel directions of the light of the light source; the plurality of interfaces are configured to divide the light guide plates into a plurality of sub-regions to prevent mutual interference between the light travelled in two adjacent sub-regions among the plurality of sub-regions.

7. The liquid crystal display according to claim 6, wherein the plurality of sub-regions are respectively disposed with mutually independent light sources.

8. The liquid crystal display according to claim 6, wherein an index of refraction of the interfaces is smaller than an index of other regions of the light guide plates.

* * * * *